United States Patent [19]

Grigorova et al.

[11] Patent Number: 5,665,668

[45] Date of Patent: Sep. 9, 1997

[54] METHOD OF MAKING A CATALYST

[76] Inventors: Bojidara Grigorova, 52 Morsim Road, Hyde Park, Sandton, Transvaal, South Africa; Atanas Palazov, 15 Pitchford Road, Northcliff, Johannesburg, Transvaal, South Africa; John Mellor, 22 Bedford Avenue, Craighall Park, Johannesburg, South Africa; James Anthony Jude Tumilty, 7B First Avenue, Rivonia, Sandton, Transvaal, South Africa; Anthony Harold Gafin, 64 Fir Road, Glenhazel, Johannesburg, Transvaal, South Africa

[21] Appl. No.: 382,076

[22] Filed: Feb. 1, 1995

Related U.S. Application Data

[63] Continuation-in-part of Ser. No. 201,678, Feb. 25, 1994, abandoned.

[30] Foreign Application Priority Data

Jan. 25, 1994 [ZA] South Africa ............... 95/0504

[51] Int. Cl.$^6$ ......................................... B01J 23/52
[52] U.S. Cl. ..................... 502/344; 502/345; 502/347; 502/330
[58] Field of Search ............... 502/314, 315, 502/316, 317, 318, 326, 327, 329, 330, 331, 344, 345

[56] References Cited

U.S. PATENT DOCUMENTS

| | | |
|---|---|---|
| 3,459,657 | 8/1969 | Krunig et al. |
| 3,839,255 | 10/1974 | Acres .................... 502/329 |
| 3,855,324 | 12/1974 | Mertzweiller et al. ........ 260/666 |
| 3,878,131 | 4/1975 | Hayes .................... 502/330 |
| 3,909,455 | 9/1975 | Rainer et al. ............. 252/466 |
| 3,928,238 | 12/1975 | Roberstein et al. ......... 502/329 |
| 4,097,368 | 6/1978 | Hayes .................... 208/139 |
| 4,191,846 | 3/1980 | Farha, Jr. et al. ......... 585/440 |
| 4,361,500 | 11/1982 | Mathe et al. ............. 252/430 |
| 4,617,283 | 10/1986 | Coughlin ................. 502/66 |
| 4,839,327 | 6/1989 | Haruta et al. |
| 4,863,890 | 9/1989 | Koll ..................... 502/230 |
| 4,880,763 | 11/1989 | Eri et al. ............... 502/302 |
| 4,880,764 | 11/1989 | Imai et al. .............. 502/326 |
| 4,898,845 | 2/1990 | Datta et al. ............. 502/339 |
| 4,921,830 | 5/1990 | Kolts .................... 502/326 |

(List continued on next page.)

FOREIGN PATENT DOCUMENTS

| | | |
|---|---|---|
| 0 395 856 | 11/1990 | European Pat. Off. |
| 0 461 452 | 12/1991 | European Pat. Off. |
| 39 14 294 | 10/1990 | Germany. |
| 796175 | 4/1958 | United Kingdom. |
| 823119 | 4/1959 | United Kingdom. |
| 1109726 | 4/1968 | United Kingdom. |
| 0299569 | 1/1989 | WIPO. |
| 0328507 | 8/1989 | WIPO. |
| WO94/27720 | 8/1994 | WIPO. |

OTHER PUBLICATIONS

International Search Report; PCT/GB95/00136; Igor Schaber; 3 May 1995.

Kageyama et al., "XAFS Studies of Ultra-fine Gold Catalysts Supported on Hematite Prepared from Co-precipitated Precursors", Physica B158, (1989) pp. 183–184.

Haruta et al., "Mechanistic Studies of CO Oxidation of Highly Dispersed Gold Catalysts . . ."; Proceedings of the 10th International Congress on Catalysis, Jul. 19–24, 1992; Budapest, Hungary; pp. 2657–2660.

Primary Examiner—Glenn A. Caldarola
Assistant Examiner—Bekir L. Yildirim
Attorney, Agent, or Firm—Fish & Richardson P.C.

[57] ABSTRACT

A method of preparing a catalyst containing at least two metals captured on a porous support, at least one of the metals being capable of forming a reducible oxide, includes the steps of providing solutions of the two metals, impregnating the support with the solution of the metal which is capable of forming a reducible oxide, exposing the impregnated support to a reducing atmosphere at a temperature exceeding 300° C. and impregnating the thus treated support with the other solution.

17 Claims, 3 Drawing Sheets

U.S. PATENT DOCUMENTS

| | | | |
|---|---|---|---|
| 4,957,896 | 9/1990 | Matsumoto et al. | 502/304 |
| 5,068,217 | 11/1991 | Falke et al. . | |
| 5,112,787 | 5/1992 | Falke et al. | 502/159 |
| 5,145,822 | 9/1992 | Falke et al. . | |
| 5,164,351 | 11/1992 | Steinbach et al. | 502/74 |
| 5,416,052 | 5/1995 | De Agudelo et al. | 502/78 |

- ● Au-Mn Conventional
- ◇ Au-Mn Reduction/Oxidation

- ● Cu-Co Reduction/Oxidation
- ▲ Cu-Co Conventional

● Au-Co/Al$_2$O$_3$ Conventional
▲ Au-Co/Al$_2$O$_3$ Reduction only
□ Au-Co/Al$_2$O$_3$ Reduction/Oxidation ● Au-Co/Al$_2$O$_3$ Reduction only
□ Au-Co/Al$_2$O$_3$ Reduction/Oxidation

- ● $O_2(300°C)-CO(300°C)-O_2(300°C)$
- ▲ $O_2(500°C)-CO(500°C)-O_2(300°C)$
- ■ $O_2(500°C)-CO(500°C)-O_2(500°C)$

METHOD OF MAKING A CATALYST

CROSS-REFERENCE TO RELATED APPLICATION

This application is a continuation-in-part of U.S. Ser. No. 08/201,678 filed Feb. 25, 1994, now abandoned.

BACKGROUND OF THE INVENTION

This invention relates to a method of making a catalyst, particularly a catalyst for use in the oxidation of carbon monoxide and hydrocarbons.

Bi-metallic catalysts for oxidation reactions are well known in the art. In such catalysts the one metal may be a transition element, generally present as an oxide, at least in part, and the other metal a noble element or both may be transition elements.

Such catalysts may be produced using various methods. For example, they are frequently made by co-precipitating the two metals from solutions containing the metals. Alternatively, the support material may be impregnated with solutions of the metals. The catalyst may be activated by heating it at a temperature of the order of 200° C. or higher.

U.S. Pat. No. 4,880,763 discloses a catalyst for converting synthesis gas composed of hydrogen and carbon monoxide to hydrocarbons. The catalyst includes cobalt, rhenium and an alkali and optionally a metal oxide powder. Such catalysts may be produced by impregnation or co-precipitation. The catalyst is activated by calcining it under flowing air at a temperature of between 200° and 500° C. The catalyst may, before use, be reduced with hydrogen.

U.S. Pat. No. 3,878,131 discloses a catalyst composite comprising a combination of a platinum group metal, tin oxide, a germanium oxide and an alkali or alkaline earth metal oxide with a porous carrier material. The active metals may be incorporated in a catalyst by co-precipitation or co-gellation. Calcining the catalyst in an air atmosphere activates the catalyst. Further, it is said that it is essential to subject the resultant calcined catalyst composite to a reduction step with substantially water-free hydrogen prior to its use in the conversion of hydrocarbons.

SUMMARY OF THE INVENTION

According to the present invention, there is provided a method of preparing a catalyst containing at least two metals captured on a porous support, at least one of the metals being capable of forming a reducible oxide, including the steps of providing solutions of the metals, impregnating the support with the solution of the metal which is capable of forming a reducible oxide, exposing the impregnated support to a reducing atmosphere at a temperature exceeding 300° C. and impregnating the thus treated support with the other solution.

DESCRIPTION OF THE DRAWINGS

FIG. 1 shows carbon monoxide conversion with a gold-manganese/aluminium oxide catalyst with and without an interposed treatment step. The reaction temperature was 30° C., the flow rate was 18 ml/min, the gold content was 0.4% by mass and the gold:manganese ratio was 1:60.

FIG. 2 shows the carbon monoxide conversion of a copper-cobalt/aluminium oxide catalyst with and without an interposed treatment step. The flow rate was 30 ml/min, the copper content was 0.2% by mass and the copper:cobalt ratio was 1:32.

FIG. 3 shows carbon monoxide conversion with a gold-cobalt/aluminium oxide catalyst with and without an interposed treatment step. The flow rate was 18 ml/min, the gold content was 0.4% by mass, the gold:cobalt ratio was 1:60 and the reaction temperature was 30° C.

FIG. 4 shows the carbon monoxide conversion with a gold-cobalt/aluminium oxide catalyst with two types of interposed treatment. The flow rate was 30 ml/min, the gold content was 0.4% by mass, the gold:cobalt ratio was 1:60 and the reaction temperature was 30° C.

FIG. 5 shows the carbon monoxide conversion of a gold-cobalt/aluminium oxide catalyst as a function of various interposed treatments. The flow rate was 70 ml/min.

DESCRIPTION OF EMBODIMENTS

Figure 1:
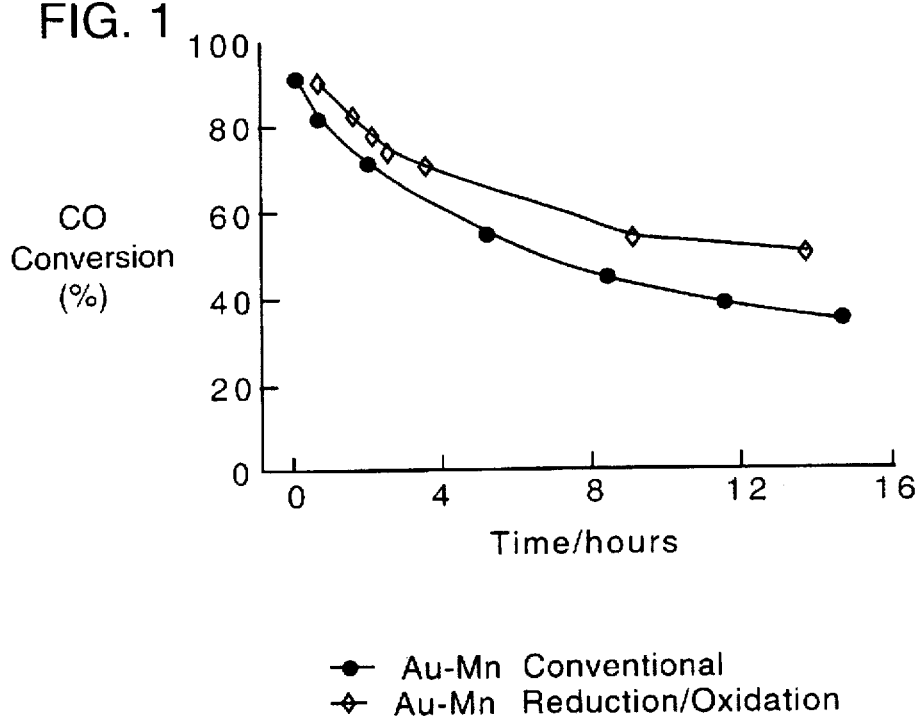
FIGS. 1 to 5 illustrate graphically the percent CO conversion, i.e. oxidation of carbon monoxide to carbon dioxide, in the presence of various catalyst systems. In these Figures.

The method of the invention results in a catalyst having at least two metals captured on a porous support. Such catalyst, has been found to be more active and more stable than similar catalysts produced by prior art methods. In particular, the inclusion of a reduction step between the sequential impregnations achieves this.

The porous support will generally be a porous oxide support such as alumina, titania, silica, zirconia, ceria or mixtures thereof. Such supports have a large surface area, typically 80 to 400 $m^2/g$. The support may take any suitable form such as a monolith, pellets, extrudates, rings, pearls, or powder.

The reduction step involves exposing the support impregnated with a metal capable of forming a reducible oxide to a reducing atmosphere which may be selected from hydrogen, carbon monoxide or mixtures thereof with another gas. Such exposure is to a temperature of at least 300° C., and preferably below 700° C. A typical preferred temperature is 500° C. Essential to the method is that this reduction step takes place between the sequential impregnations.

After exposure to the reducing atmosphere, and before the subsequent impregnation, the support may be exposed to an oxidising atmosphere. Such exposure may be mild, i.e. at a temperature less than 50° C. and typically a temperature in the range 25° to 35° C. These conditions will be used particularly when hydrogen is the reducing gas in the reduction step. When the reducing gas in the reduction step is carbon monoxide, higher oxidation temperatures of typically 200° C. to 500° C. may be used to achieve good catalyst stability. Examples of suitable oxidising atmospheres are oxygen or oxygen mixed with another gas, e.g. air.

The support is preferably dried after at least the first impregnation. Drying may be achieved at a temperature of up to 150° C. and can take place over several hours and up to 24 hours. A preferred temperature range for the drying is 80° to 140° C. Such drying may take place at ambient pressure.

The solvent of the solutions may be any known in the art. For example, the solvent may be organic such as an alcohol, an ether or a mixture of an alcohol and ether. The solvent is preferably water. When water is the solvent, the solutions preferably have an acidic pH. For aqueous solutions, chlorides and sulphates may be used, but as they can poison the catalyst, they are generally to be avoided. The preferable solutions are nitrate solutions. They may also be acid solutions, wherein the acid contains a metal to be captured on the support.

The reduction step has the effect of reducing metallic compounds captured on the support during the first impregnation. The metallic compounds will generally be present in the impregnating solution in the form of a salt. Such a salt will typically be converted, at least to some extent, to an oxide when the support is dried in the manner described above. Such salts and/or oxides will be reduced to the metals during the reduction step.

The method of the invention is applicable to metallic catalysts known in the art. For example, the catalyst may be one containing two different metals both of which are capable of producing reducible oxides. Examples of such metals are tin, cerium or a transition metal such as zinc, iron, copper, cobalt, zirconium, nickel, chromium or manganese. The catalyst may also be one containing such a metal, as one of the metals, and a noble metal, as the other metal.

In one preferred form of the invention, the method is used to produce a catalyst comprising gold and a metal capable of producing a reducible oxide, as listed above, preferably cobalt or manganese, captured on a porous oxide support. The method includes the steps of impregnating the support with a solution of the metal capable of producing a reducible oxide, exposing the impregnated support to a reducing atmosphere at a temperature exceeding 300° C., and impregnating the thus treated support with a solution of gold.

The catalyst produced by the method of the invention is activated by heating the support having the two metals captured thereon in an oxidising atmosphere at a temperature of at least 300° C. It has been found preferable that this heat treatment be followed by a heat treatment, also at a temperature exceeding 300° C., in a reducing atmosphere, and thereafter a further heat treatment in an oxidising atmosphere at a temperature of at least 300° C. The oxidising atmosphere may be pure oxygen but it is preferably oxygen mixed with another gas such as nitrogen. The reducing atmosphere may be pure hydrogen or pure carbon monoxide, but is preferably either of these gases mixed with another gas such as nitrogen.

Gold-containing catalysts produced by the method of the invention have been found to have excellent carbon monoxide oxidation activity and stability. Such catalysts have application, in particular, in the exhaust systems of motor vehicles, gas safety masks, the purification of air in mines and underground operations, the purification of various industrial effluent gases, the re-cycling of carbon dioxide in lasers and in fuel cells. Further, such catalysts can catalyse the oxidation of hydrocarbons, for example, to water and carbon dioxide, at temperatures above 200° C.

The invention is illustrated by the following examples.

Example 1 illustrates a method of making a catalyst by a prior art or conventional method falling outside the scope of this invention, while Examples 2 to 5 illustrate embodiments of a method of making a catalyst of the invention.

EXAMPLE 1

An aliquot of porous alumina support material (3 g) was dried at 120° C. for two hours. The sample was placed in a receptacle forming part of a vacuum system. Following evacuation with a mechanical pump for 1.5 minutes, the support material was placed in the impregnating solution (4.5 ml of cobalt nitrate solution, 2.7 mol l$^{-1}$). The vacuum pump was left running for a further two minutes. After venting the system to the atmosphere the excess solution was removed and the support material was dried for 14 hours at 120° C.

The product of Step 1 was impregnated with an aqueous gold solution following a similar procedure to that employed when impregnating with the cobalt. The dried product of support material containing the cobalt compound was introduced to 4.5 ml tetrachloroauric acid solution (0.077 mol l$^{-1}$ pH 1.3) under reduced pressure as achieved by drawing a vacuum with a mechanical pump for about 1.5 minutes. Within about 30 seconds after introducing the support material to the gold solution, the system was vented to the atmosphere and the excess solution was removed. The sample was dried in air at 120° C. for about 12 hours.

Activation was achieved by heating the impregnated support in a 30 ml/minute flow of pure oxygen to a temperature of 500° C. and this temperature maintained for about 20 to 30 minutes.

EXAMPLE 2

Porous alumina support material (1–4 g) was accurately weighed and dried in an oven at 120° C. for a minimum of 2 hours. The dry material was impregnated with a cobalt nitrate solution in vacuo, as in Example 1.

The cobalt impregnated alumina support material was dried for a minimum of 24 hours at 120° C., causing some decomposition of the nitrate. Following drying, the material was heated at 500° C. under flowing hydrogen (30 ml/min) and held at this temperature for 20 minutes. Following this, the material was allowed to cool in flowing hydrogen to room temperature. The material was thereafter treated with oxygen or other oxidising atmosphere at a temperature of less than 40° C., i.e. 25° C. to 35° C., for a period of 20 to 30 minutes.

The thus treated product was impregnated with a gold solution typically a tetrachloroauric acid or ammonium tetrachloroaurate solution, as in Example 1.

The impregnated support material was activated by heating it in a 30 ml/minute flow of pure oxygen to a temperature of 500° C. This temperature was maintained for a period of 20 minutes.

X-ray diffraction studies of the catalyst produced by Example 2 showed that $Co_3O_4$ and a $CoAl_2O_4$ spinel were formed on the alumina with gold atoms or freely-divided gold particles in intimate contact therewith.

EXAMPLE 3

Porous alumina support was impregnated with a cobalt nitrate solution according to the procedure set out in Example 2.

Following cobalt impregnation, the material was dried for a minimum of 24 hours at 120° C. Following drying, the material was heated to 500° C. under flowing oxygen (30 ml/min) and held at this temperature for 10 minutes. Subsequent to oxidation at 500° C., the material was exposed to a flow of carbon monoxide (30 ml/min) at 500° C. The material was cooled in flowing carbon monoxide to between 450° C. and 25° C., preferably between 300° C. and 200° C., at which temperature the material was treated with oxygen or other oxidising atmosphere at a temperature of 300° C. and allowed to cool to room temperature (if required).

As in the method of Examples 1 and 2, the thus treated product was impregnated with a gold solution, typically tetrachloroauric acid or ammonium tetrachloroaurate solution.

Activation was effected by heating the product in a 30 ml/min flow of pure oxygen to a temperature of 500° C. for 20 minutes.

EXAMPLE 4

Pelletised alumina support (35 g) was weighed and dried in an oven at 120° C. for two hours. The dry alumina pellets were impregnated with a cobalt nitrate solution in vacuo as in Example 2.

The aliquots of 5 g of alumina support impregnated with cobalt solution was dried for 24 hours at 120° C. Following drying at 120° C. for a period of about 24 hours, the material was heated to 500° C. under flowing hydrogen (30 ml/min) and held at this temperature for 20 minutes. After reduction in hydrogen at 500° C., the material was cooled to room temperature in hydrogen flow. The material was exposed to air temperature of less than 40° C. for a period of 20 minutes.

The thus treated product was impregnated with a solution of tetrachloroauric acid, as in Example 1.

Activation of the catalyst was carried out by heating 1 g of sample in a 30 ml/min flow of pure oxygen to a temperature of 500° C.

Oxidation of the catalyst was continued for a period of 10 minutes at 500° C. After flushing the sample in a flow of nitrogen at 500° C., the catalyst was reduced in 30–50 ml/min pure carbon monoxide at 500° C. for 20 minutes. Following reduction, the catalyst was cooled from 500° C. to 350° C. in a flow of pure nitrogen at 50 ml/min. The catalyst was subsequently re-oxidised in a pure oxygen stream of 50 ml/min at 350° C. for 15 minutes. The oxygen environment was maintained during sample cooling to room temperature.

EXAMPLE 5

Cobalt nitrate solution (3,3M, 10.0 ml) was added dropwise to a moderately stirred slurry of porous, fine powdered alumina support (10.0 g) in 15 ml deionised water. The temperature of the slurry was elevated from 25° C. to 65° C. over a period of 15 minutes. After 1.5 hours of stirring at the elevated temperature, the major part of the solvent had evaporated, leaving a thick paste. This paste was transferred to an oven and was dried in static air at 120° C. for 22 hours.

Following druing, the material was heated at 500° C. under flowing hydrogen (30 ml/min) and then allowed to cool in flowing hydrogen to room temperasture. The sample was flushed with nitrogen, and introduced to water (35 ml) with minimal exposure to air. Tetrachlorauric acid solution (0.0508M, 5 ml) was added to the stirred slurry, and the temperature was raised to 65° C. over 10 minutes. Evaporation of the solvent was complete after 3.7 hours. The catalyst precursor was dried in static air in an oven at 120° C., resulting in a fine black powder product (0,42 (w/w) Au, 7.3% (w/w) Co.

Activation of the precursor was achieved using the method set out in Example 4. In this case, however, 2% carbon monoxide with the balance nitrogen to 100% was used for the reduction, whilst 5% oxygen with the balance nitrogen to 100% was used for the oxidation.

CATALYST ACTIVITY AND STABILITY TESTS

The activity and stability of a catalyst produced by the method of Example 2, i.e. according to the invention, and a catalyst produced by the prior art or conventional method, were compared in a series of experiments. For the method of the invention, catalysts were produced using not only a reduction step only, but also both a reduction step and an oxidation step, between the impregnation steps. The activity of various catalysts produced by the method of the invention under various conditions was also evaluated.

The apparatus used for these experiments consisted of a three-fixed bed laboratory micro-reactors, two constructed from stainless steel and one from quartz glass. The design enabled simultaneous testing of several samples under identical experimental conditions. Gas was supplied to the reactor through a manifold which incorporated flow meters and fine control needle valves for regulating flow rates. The results obtained from these experiments are illustrated by FIGS. 1, 2, 3, 4 and 5 and by Tables 1 and 2. The reactant mixture for the experiments from which FIGS. 1 to 5 were produced had the following composition: 1%CO; 0.5 to 25% oxygen; balance to 100% nitrogen. Reactant velocities of 10–70 ml/min were used. For the experiments from which the data of Tables 1 and 2 were produced a reaction mixture containing 350 ppm propane, 350 ppm propene, 1.0% carbon monoxide, 0.9% oxygen, balance to 100% nitrogen was used. The reactant velocity for the Table 1 data was 300 ml/min, and 1000 ml/mln for the Table 2 data.

FIG. 1 compares a gold-manganese/aluminium oxide catalyst produced by the method of this invention with a similar catalyst produced by the conventional method. The gold content of the catalyst was 0.4% by mass and the Au:Mn atomic mass ratio was 1:60. It will be noted from this Figure that the activity and stability of the catalyst prepared by the method of the invention are better than that of the catalyst produced by the conventional method.

Figure 2:
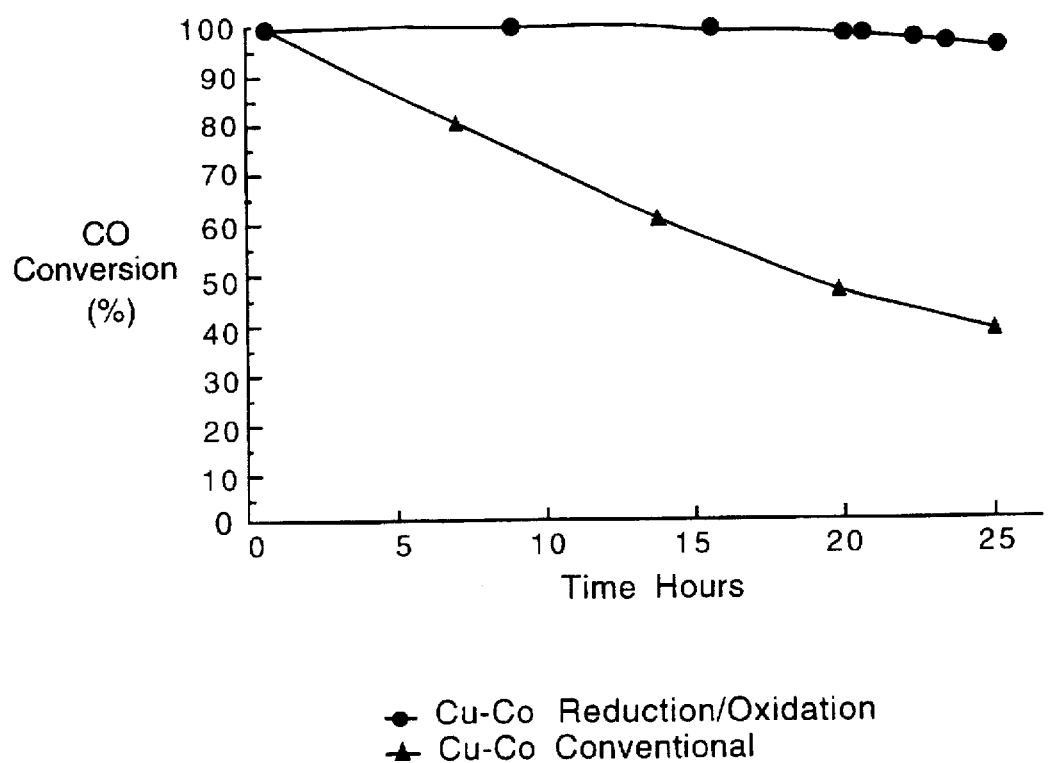

FIG. 2 compares a copper-cobalt/aluminium oxide catalyst produced by the method of this invention with a similar catalyst produced by the conventional method. It will be noted from this Figure that there was a sharp drop in CO conversion after 5 hours for the catalyst produced using the conventional method, whereas the catalyst prepared using the method of the invention achieved excellent CO conversion even after 25 hours.

Figure 3:
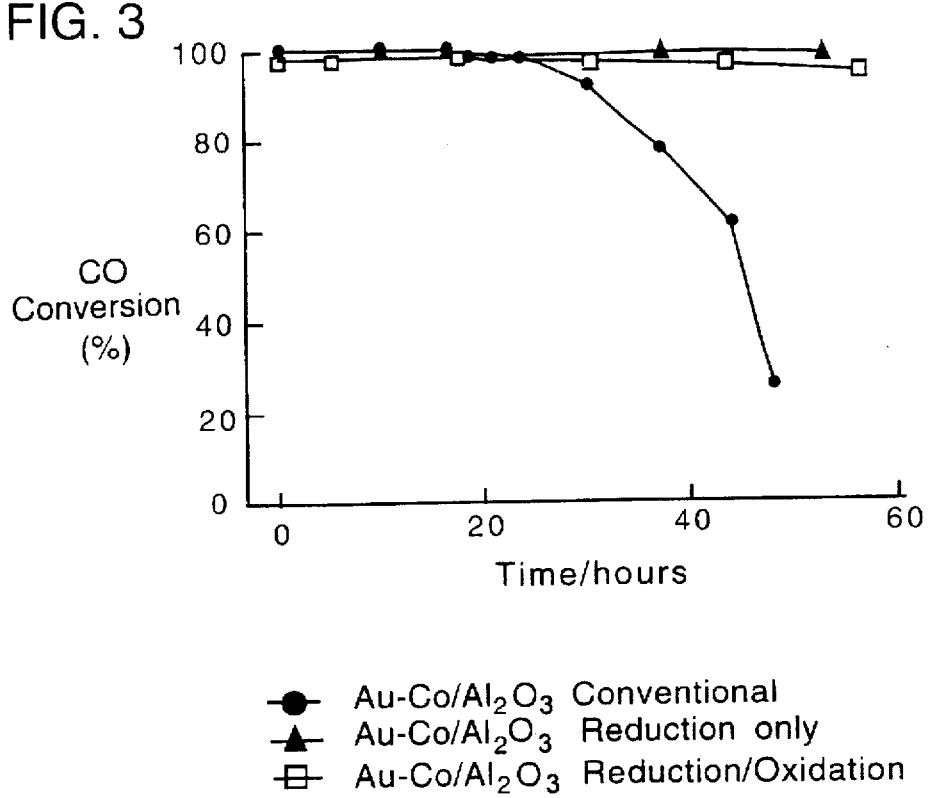
Figure 4:
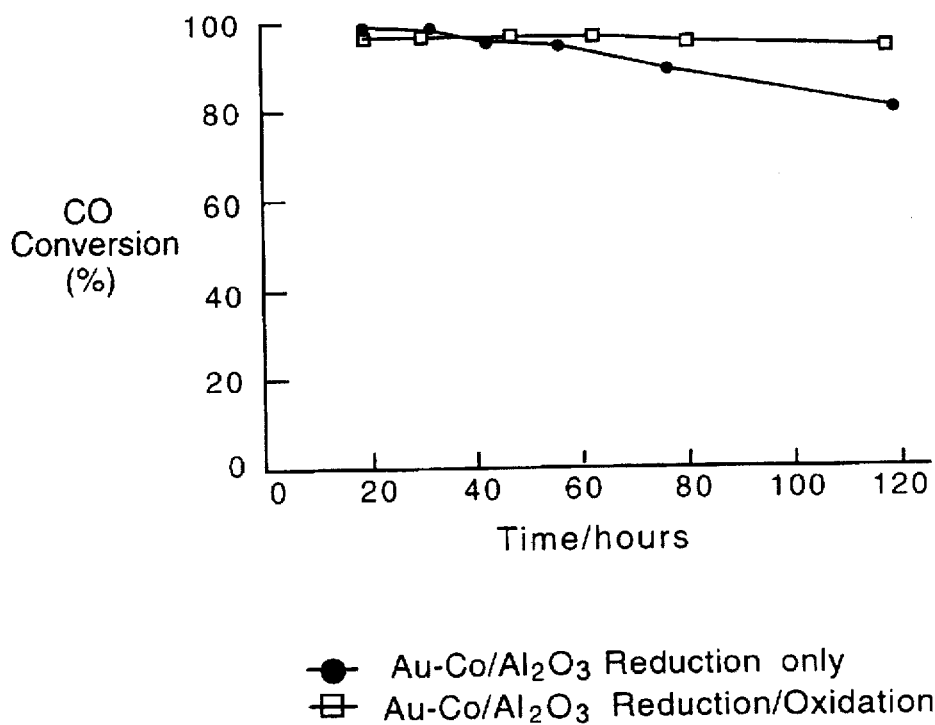

FIGS. 3 and 4 show the improvement in activity of a gold-cobalt/aluminium oxide catalyst (0.4% by mass Au) produced by the method of this invention. It will be noted from FIG. 3 that there was a sharp drop in CO conversion after 30 hours using the conventional method of preparation. Further, from FIG. 4 it will be noted that reduction followed by oxidation according to the invention achieved better stability over 120 hours-on-stream test than using reduction only.

Figure 5:
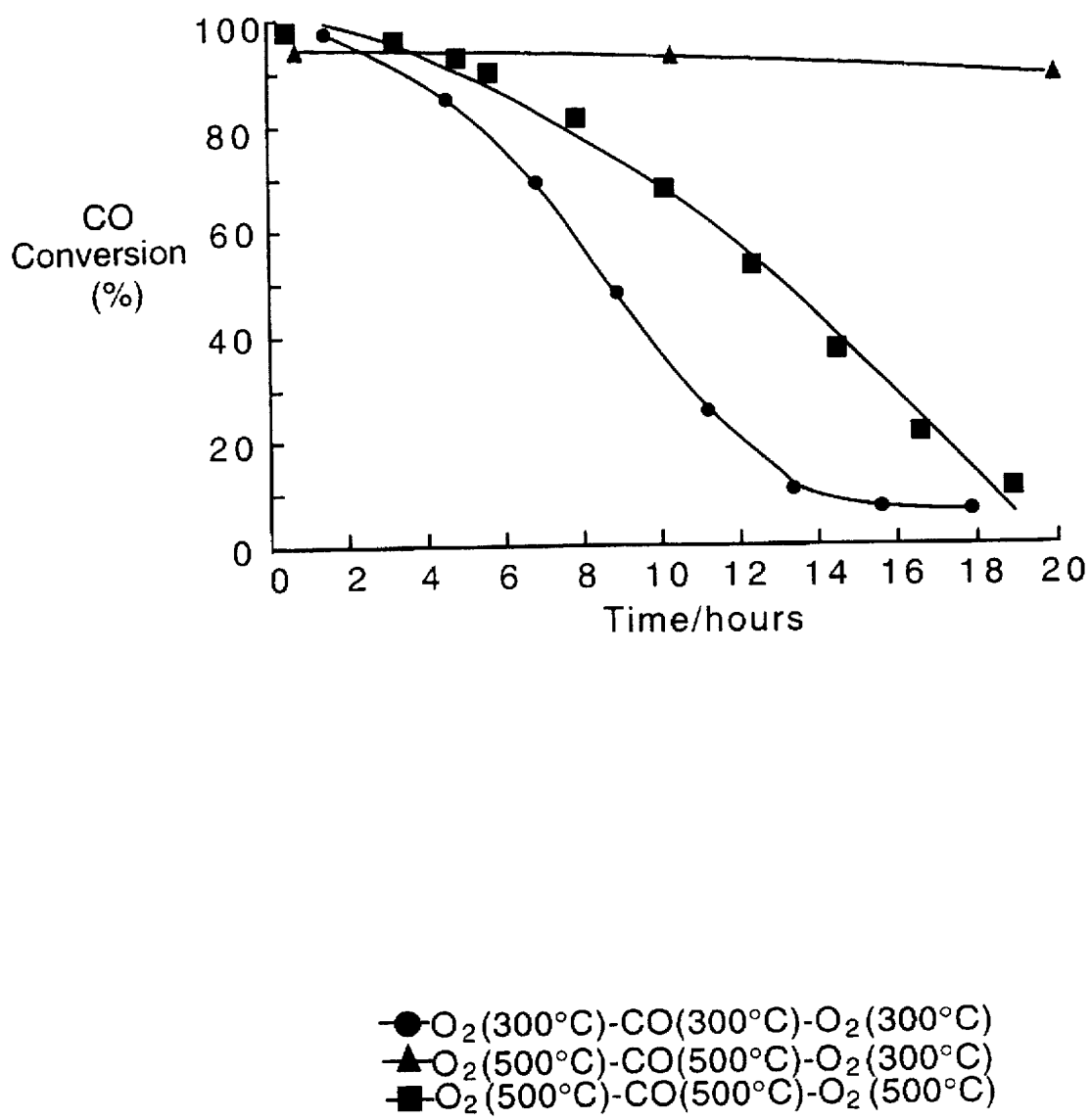

FIG. 5 compares catalyst produced following the method described in Example 3 but using various reduction/oxidation treatment conditions between the sequential impregnations. From FIG. 5, it can be seen that reduction in carbon monoxide and at temperatures greater than 300° C., preferably 500° C., produces the best catalyst stability for CO oxidation at 30° C. Furthermore, oxidation after reduction in carbon monoxide, is important. Chemisorption studies have shown that CO conversion capacity of the catalyst drops sharply after 6 hours when oxidation treatment is used after high temperature, i.e. 500° C., CO reduction. However, oxidation at 300° C. after reduction has shown to be particularly effective.

Table 1 shows the carbon monoxide (CO) and hydrocarbon (HC) conversion at selected reaction temperatures of a catalyst produced by the method of Example 4 and using two different activation procedures. From the results, it can be seen that when the activation procedure involves CO—$O_2$ the catalyst simultaneously oxidises carbon monoxide and hydrocarbons. The catalyst oxidation activity is evident at low temperatures (i.e. 25°–50° C.) and increases with rising reaction temperature.

TABLE 1

| Reaction Temperature | CO Conversion (%) | | Hydrocarbons Conversion (%) | |
| --- | --- | --- | --- | --- |
| | $O_2$ Treatment | $CO$—$O_2$ Treatment | $O_2$ Treatment | $CO$—$O_2$ Treatment |
| 30° C. | 34,0 | 35,0 | 0 | 16,0 |
| 220° C. | 32,0 | 36,0 | 0 | 13,0 |
| 315° C. | 77,0 | 83,0 | 16,0 | 32,0 |
| 410° C. | 93,0 | 94,0 | 83,0 | 86,0 |

Test conditions: 300 ml/min flow rate.

The CO and HC oxidation activity at various reaction temperatures of a catalyst prepared by the method of Example 5 and using two different activation procedures is shown in Table 2. It is evident from the results that preparation utilising a powdered alumina support and activation in sequential flows of oxygen-carbon monoxide-oxygen produces the best catalyst capable of simultaneous oxidation of CO and HC at low reaction temperature (i.e. 25°–50° C.) and at higher reaction temperature at significantly higher space velocities compared to a similar catalyst prepared on alumina pellets (Example 4).

TABLE 2

| Reaction Temperature | CO Conversion (%) | | Hydrocarbons Conversion (%) | |
| --- | --- | --- | --- | --- |
| | $O_2$ Treatment | $CO$—$O_2$ Treatment | $O_2$ Treatment | $CO$—$O_2$ Treatment |
| 35° C. | 35,0 | 42,0 | 7,0 | 15,0 |
| 200° C. | 32,0 | 36,0 | 7,0 | 15,0 |
| 300° C. | 100,0 | 100,0 | 36,0 | 50,0 |
| 400° C. | 100,0 | 100,0 | 83,0 | 86,0 |

Test conditions: 1000 ml/min flow rate.

We claim:

1. A method of preparing a catalyst containing at least two metals captured on a porous support, at least one of the metals being a transition metal and the other being gold, including the steps of providing solutions of the metals, impregnating the support with the solution of the transition metal, exposing the impregnated support to a reducing atmosphere at a temperature exceeding 300° C., impregnating the thus treated support with the solution of gold, and exposing the support, impregnated with both of the solutions, to a temperature exceeding 300° C. in an oxidizing atmosphere.

2. A method according to claim 1 wherein the reducing atmosphere is selected from hydrogen, carbon monoxide and mixtures of either gas with another gas.

3. A method according to claim 1 wherein the exposure of the impregnated support to a reducing atmosphere is at a temperature below 700° C.

4. A method according to claim 1 wherein the exposure of the impregnated support to a reducing atmosphere is at a temperature of 500° C.

5. A method according to claim 1 wherein the solvent of at least one of the solutions is selected from alcohols, ethers and mixtures thereof with water.

6. A method according to claim 1 wherein the solvent of at least one of the solutions is water.

7. A method according to claim 1 wherein the metal in at least one of the solutions is in the form of a salt.

8. A method according to claim 1 wherein the metal in at least one of the solutions is in the form of a nitrate or an acid containing the metal.

9. A method according to claim 1 wherein the impregnated support is dried after at least the first impregnation step.

10. A method according to claim 9 wherein drying takes place at a temperature of 80° to 140° C.

11. A method according to claim 1 wherein the oxidising atmosphere is selected from oxygen and oxygen mixed with another gas.

12. A method according to claim 1 wherein the exposure of the impregnated support to the oxidizing atmosphere is followed by exposure of the support to a reducing atmosphere at a temperature exceeding 300° C. and thereafter to an oxidising atmosphere at a temperature of at least 300° C.

13. A method according to claim 12 wherein the reducing atmosphere is selected from hydrogen and carbon monoxide and either such gas mixed with another gas.

14. A method according to claim 13 wherein the oxidising atmosphere is selected from oxygen and oxygen mixed with another gas.

15. A method according to claim 1 wherein the transition metal is selected from zinc, iron, copper, cobalt, zirconium, nickel, chromium and manganese.

16. A method according to claim 1 wherein the porous support is a porous oxide support.

17. A method according to claim 16 wherein the oxide is selected from titania, silica, alumina, zirconia, ceria and mixtures thereof.

* * * * *